March 22, 1938.　　　　J. E. MINTY　　　　2,111,917
DROP PIT APPARATUS
Filed June 26, 1937　　　2 Sheets-Sheet 1
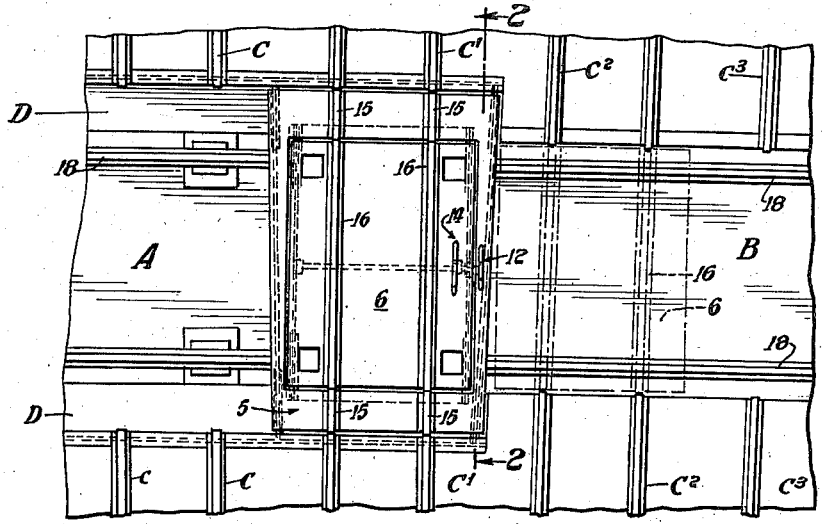
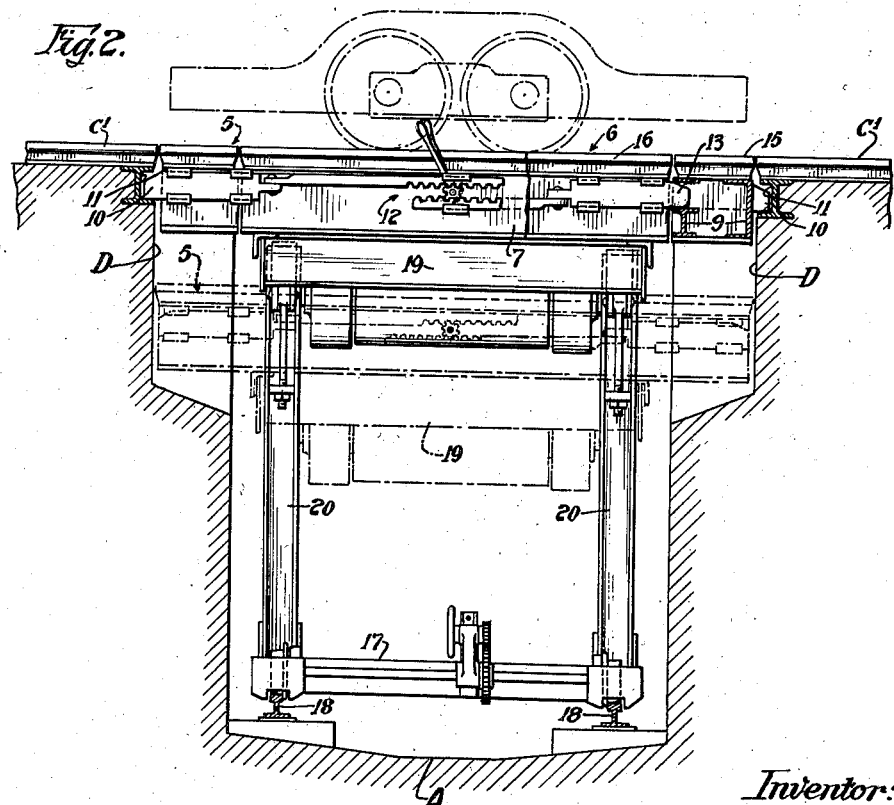
Inventor:
John E. Minty,
Attorneys.

Inventor:
John E. Minty,

Patented Mar. 22, 1938

2,111,917

UNITED STATES PATENT OFFICE 2,111,917

DROP PIT APPARATUS

John E. Minty, Muskegon, Mich., assignor to Manning, Maxwell & Moore, Inc., New York, N. Y., a corporation of New Jersey Application June 26, 1937, Serial No. 150,473

11 Claims. (Cl. 104—32)

The invention relates to apparatus for servicing locomotives and other railroad vehicles, and more particularly to drop pit apparatus for handling the trucks and wheels of such vehicles.

One object of the invention is to provide improved apparatus of the above general character which can be installed at minimum cost and which is adapted for the efficient servicing of a wide variety of railroad vehicles.

Another object is to provide an improved drop pit apparatus by which the transfer of small trucks and single pairs of wheels between a vehicle and the service track is greatly facilitated.

Still another object is to provide a novel drop pit apparatus embodying a pit having contiguous wide and narrow sections each intersecting one or more service and repair tracks and a drop table comprising a plurality of separable sections or independent tops constructed and arranged so that they may be assembled together to provide a unitary table structure suitable for bridging the wide section of the pit, one of said independent tops being alternatively available for bridging the narrow section of the pit whereby the table equipment may be used most efficiently.

Other objects and advantages will become apparent from the detailed description of the preferred embodiment of the invention illustrated in the accompanying drawings, in which:

Figure 1 is a fragmentary plan view of a drop pit installation embodying the features of the invention.

Fig. 2 is a transverse sectional view of the pit taken along the line 2—2 of Fig. 1, showing the drop table latched across the wide section of the pit.

Figure 3:
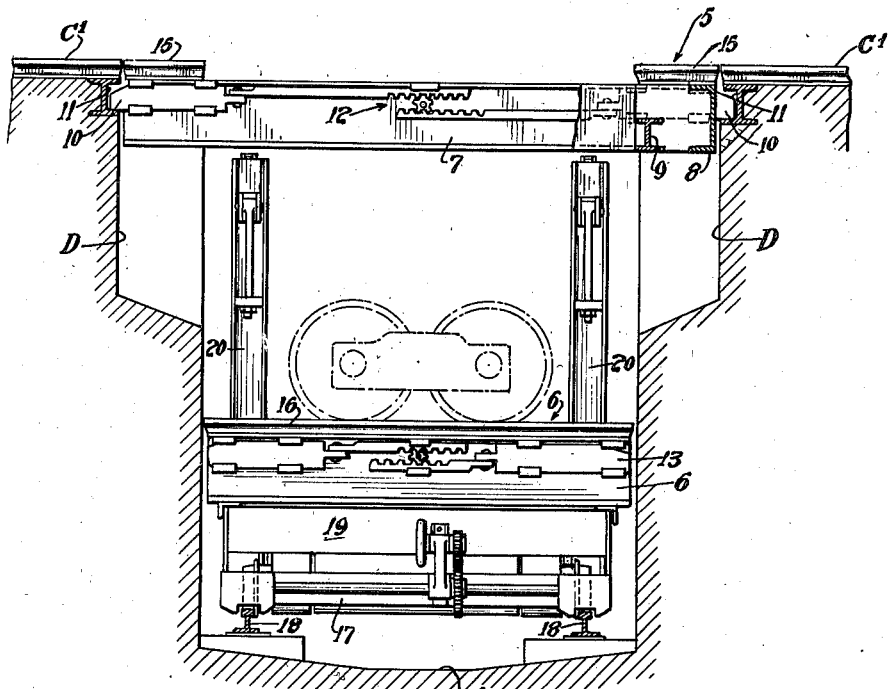
Fig. 3 is a transverse sectional view of the pit taken along the same line as Fig. 2, showing the sub-top of the table lowered to drop a short truck into the pit.

In carrying out the invention, I provide a drop pit having a relatively wide section A and a substantially narrower contiguous section B, each preferably intersecting a plurality of generally parallel or convergent service and repair tracks. Four such tracks designated respectively C, C¹, C², C³ have been shown in Fig. 1 of the drawings by way of illustration, but it is to be understood that any number of tracks may be used. Section A of the pit is of sufficient width to accommodate the largest trucks requiring service as, for example, booster locomotive trucks. Section B on the other hand may be just wide enough to receive a short truck such as a passenger coach or freight car truck, or a single pair of wheels.

One or more drop tables, depending upon the size of the installation, are provided for bridging the pit. Such tables may be of any suitable construction, but in order to obtain the full advantages in economy of installation, as well as increased operating efficiency, a table of the general type disclosed in my copending application Serial No. 48,728, filed November 7, 1935, is preferred.

As shown in the drawings, the drop table comprises a generally rectangular main top 5 adapted to bridge the wide section A of the pit and having an opening of substantially the same width as the narrow section B of the pit in which is disposed a detachable sub-top 6. The main top 5 is built up of side beams 7 and cross beams 8 (Figs. 2 and 3) riveted or otherwise secured together to form a rigid structure capable of sustaining the weight of a heavy vehicle such as a locomotive. Additional cross members 9, preferably in the form of I-beams, at opposite ends of the main top, define the limits of the opening for the sub-top and provide support for the same, as will appear presently.

The main top 5 is equipped with the usual latches 10 (Figs. 2 and 3) engageable in suitable recesses 11 in the side walls of the pit to releasably support the table in pit bridging position. Latch operating mechanism of well known construction, generally designated by the reference character 12, is provided for moving the latches 10 into and out of latching position. Similar latches 13 with appropriate operating mechanism 14 are provided for releasably supporting the sub-top 6 on the main top. To this end, the latches 13 are arranged when operated to rest on the cross members 9 of the main top, as shown in Fig. 2. The latches 13 are also adapted to cooperate with suitable recesses 14ᵃ (Fig. 4) formed in the side walls of the narrow section B of the pit to support the sub-top in pit-bridging position. It will thus be apparent that the sub-top 6 may be used interchangeably for bridging the opening in the main top 5 or for bridging the narrow section B of the pit.

The main top 5 and the sub-top 6 are provided with rails 15 and 16, respectively forming tracks of the same gauge as the tracks C—C³ and adapted when alined therewith to provide an extension track whereby a vehicle may be moved from a repair track into operative position relative to the pit. Likewise, a truck or pair of wheels may be transferred between the table and a service track by simply rolling the same onto or off of the table.

Means is provided for raising, lowering and transporting the drop table as a unit or for handling the sub-top independently of the main top. As herein shown, this means comprises an elevator mechanism similar to the elevator shown in my copending application, above referred to, comprising a carriage or trolley 17 adapted to run on a track 18 extending through the entire length of the pit. The carriage is provided with the usual table 19 supported at its four corners by a suitable lifting means 20 by which it may be raised or lowered as required.

Figure 4:
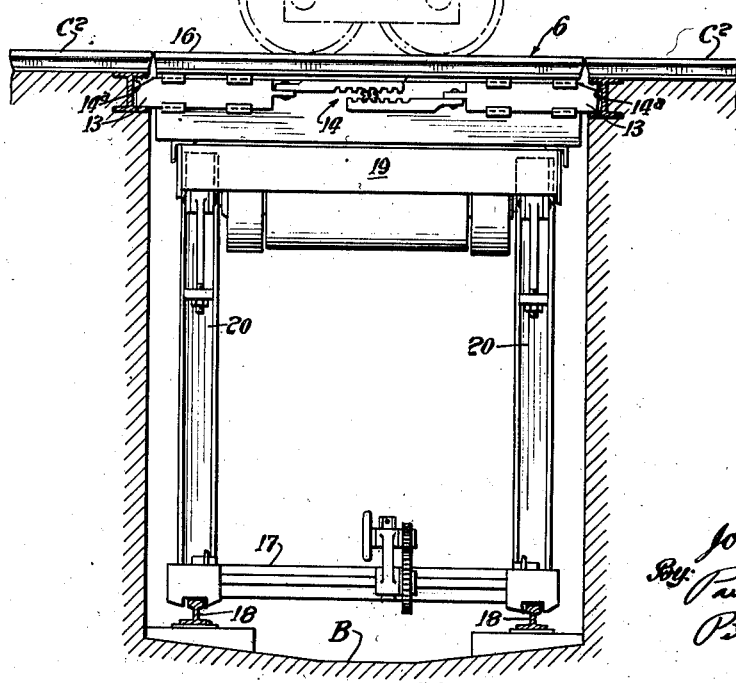
Fig. 4 is a transverse sectional view through the narrow section of the pit showing the sub-top latched in pit-bridging position.

As will be seen by reference to Figs. 3 and 4 of the drawings, the trolley and elevator mechanism are designed to operate in either the wide or the narrow section of the pit and for this reason are made substantially narrower than the wide section of the pit. Accordingly, when the mechanism is utilized for handling the table top as a unit, the ends of the table will overhang the edges of the elevator mechanism. In order to maintain the equipment in proper balance under these conditions, it is desirable to arrange the wide and narrow pit sections on substantially the same center line and to place the sub-top substantially centrally of the main top. This arrangement also insures proper positioning of the sub-top on the elevator table for transfer between the main top to the narrow section of the pit.

With elevator mechanism of the above character, it is ordinarily unnecessary that the section A of the pit be full width from top to bottom. As shown in Figs. 2 and 3, the upper pit walls may be recessed as at D, providing a full width portion deep enough to permit the table top and its load to be lowered sufficiently to clear the brake rigging and other apparatus depending from the vehicle when the load is to be moved out from under the vehicle. It will be apparent that this construction permits a substantial reduction in the initial cost of the pit installation.

When relatively long trucks, such as booster trucks, are to be serviced, the complete table is latched across the wide section A of the pit, as shown in Figs. 1 and 2, so that the rails 15 and 16 form a continuation of one of the tracks as, for example, the repair track C¹. The vehicle to be serviced is then run onto the table with the truck positioned as indicated in Fig. 2. To facilitate disconnection of the truck from the vehicle and to allow the latches 10 to be withdrawn, it is ordinarily advisable to raise the table slightly above the level of the repair track. This may be done in well known manner by the elevator mechanism.

After withdrawal of the latches and the disconnection of the truck, the table and its load may be lowered into the pit to the position shown in dotted lines in Fig. 2. In this position, the top of the truck will clear the under parts of the vehicle and may be transported to the service track C by movement of the trolley 17 along its track in the usual manner. The table is then elevated to the level of the track C and latched to the pit walls, so that the truck may be rolled off onto the service track C.

A short truck or single pair of wheels may be removed at either the wide section or the narrow section of the pit. Assuming that the table is bridged across the wide section of the pit, as shown in Fig. 1, the vehicle is run onto the table with the truck to be serviced spotted on the sub-top. The sub-top is then lifted slightly by interposing suitable spacing means between it and the elevator table to permit release of the latches 13. Upon release of the latches, the sub-top may be dropped into the pit to the position shown in Fig. 3. It is necessary in this case to lower the table and its load sufficiently to clear the side beams of the main top which remains in pit-bridging position to support adjacent pairs of wheels. The trolley with its elevating mechanism is then moved along the track in the pit until the rails of the sub-top are in alinement with the rails of one of the tracks intersected by the narrow section of the pit, as for example, the track $C^2$, and the sub-top is raised to the level of the track and latched in position, as shown in Fig. 4, so that the truck or pair of wheels may be rolled off onto the service track.

When desired, the narrow section of the pit may be used for all operations involved in handling short trucks or pairs of wheels. In this case, the sub-top is bridged across the pit to receive the vehicle requiring service. When the truck is properly spotted upon the sub-top, the latches are withdrawn and the sub-top and its load lowered into the pit and transported to another track intersected by the narrow section of the pit, for example, the track section $C^3$, and the truck is transferred to such track in the usual manner. In order to take full advantage of this operating feature, it may be desirable in some instances to provide a plurality of sub-tops which may be interchangeably associated with the main top. Thus, one sub-top may be used to provide a bridge across the narrow section of the pit at all times, while the other sub-top is assembled with the main top to bridge the wide section of the pit.

It will be apparent from the foregoing that the invention provides a comprehensive drop pit system which is effective to handle a wide variety of work. Only a short section of the pit sufficient to handle the long trucks requiring service is excavated to full width, thus materially reducing the cost of the pit installation. Moreover, since the sub-top is interchangeable between the main top and the narrow section of the pit, the aggregate amount of equipment required for the installation is reduced to a minimum. Likewise, complicated mechanism for transferring the load from a sub-top to the service track is eliminated, since the sub-top may be latched directly to the walls of the narrow section of the pit.

I claim as my invention:

1. In drop pit apparatus for servicing railroad vehicles, the combination with a pair of tracks for the vehicles, of a drop pit having a relatively wide section intersecting one of said tracks and a substantially narrower section intersecting the other track, a drop table adapted to bridge the wide section of the pit comprising a main top adapted to be latched across the wide section of the pit and a sub-top releasably supported in an opening in the main top, said sub-top being adapted to act independently of the main top to bridge the narrow section of the pit, and elevator means for raising and lowering said table as a unit in the wide section of the pit to drop a truck from a vehicle and for raising and lowering the sub-top independently of the main top in either section of the pit to drop a single pair of wheels from the vehicle, said main top remaining in pit-bridging position when the sub-top is detached therefrom.

2. The combination with a drop pit having contiguous wide and narrow sections, of a drop table comprising a main top of substantially the same width as the wide section of the pit and a sub-top of substantially the same width as the narrow section of the pit, means releasably supporting said main top in position to bridge the wide section of the pit, means operative to releasably support said sub-top alternatively on the main top or in position to bridge the narrow section of the pit, a carriage disposed in said pit and movable through both sections thereof, and elevator means on said carriage for raising, lowering and transporting the table as a unit in the wide section of the pit, said elevator being operative to raise and lower the sub-top independently of the main top and, in cooperation with said carriage, to transport the sub-top from one section of the pit to the other.

3. In drop pit apparatus for servicing railroad vehicles, in combination, a pair of tracks for the vehicles, a drop pit having a relatively wide section intersecting one of said tracks and a substantially narrower section intersecting the other track, a drop table for bridging the wide section of said pit comprising a main top extending across the pit and having a generally rectangular opening of substantially the same width as the narrow section of the pit, a sub-top adapted to fit into said opening and to bridge the narrow section of the pit, means releasably supporting the main top from the sides of the pit so that the table may be lowered as a unit into the wide section of the pit, and latch means carried by said sub-top operative to releasably support the sub-top on said main top or on the walls of the narrow section of the pit.

4. In drop pit apparatus for servicing railroad vehicles, in combination, a pair of tracks for the vehicles, a drop pit having a relatively wide section intersecting one track and a substantially narrower section intersecting the other track, a drop table for bridging the wide section of the pit and having an opening therein of substantially the same width as the narrow section of the pit and a sub-top adapted to be releasably supported on said main top to bridge said opening or to be releasably supported on the walls of the narrow section of the pit to bridge the pit.

5. In drop pit apparatus, in combination, a pit having contiguous wide and narrow sections arranged on a common center line, a drop table adapted to bridge the wide section of the pit, said table having a centrally disposed opening of substantially the same width as the narrow section of the pit, and a sub-top releasably supported in said opening, said sub-top being operative to bridge the narrow section of the pit.

6. In drop pit apparatus for servicing railroad vehicles, in combination, a pair of tracks for the vehicles, a drop pit having a relatively wide section intersecting one track and a substantially narrower section intersecting the other track, a drop table for bridging the wide section of the pit and having an opening therein of substantially the same width as the narrow section of the pit, and a sub-top adapted alternatively to bridge said opening or the narrow section of the pit.

7. Drop pit apparatus comprising, in combination, a pit having contiguous wide and narrow sections, a drop table adapted to be releasably supported on the walls of the wide section of the pit to bridge the pit, said table having an opening of substantially the same width as the narrow section of the pit, a sub-top adapted alternatively for bridging said opening or for bridging the narrow section of the pit, and means operating in the pit for raising and lowering the sub-top and for conveying it from one pit section to the other.

8. The combination with a drop pit having contiguous wide and narrow sections, of a drop table comprising a main top adapted to bridge the wide section of the pit, and a sub-top releasably supported on said main top, said sub-top being of substantially the same width as the narrow section of the pit and adapted to be releasably supported in position to bridge the said narrow section of the pit.

9. The combination with a drop pit having contiguous wide and narrow sections, of a drop table comprising a main top and a sub-top, means releasably supporting the main top on the walls of the wide section of the pit, and means releasably supporting the sub-top on the main top so that it may be raised or lowered independently of the main top while the main top remains in pit bridging position, said last mentioned supporting means being operative to releasably support the sub-top on the walls of the narrow section of the pit to bridge the same.

10. In drop pit apparatus for servicing railroad vehicles, in combination, a plurality of tracks, a drop pit capable of receiving a relatively short truck or a single pair of wheels to be dropped from a vehicle, recesses formed in opposite side walls of the pit for a portion of its length to increase the effective width of such portion to accommodate relatively long trucks to be dropped from a vehicle, a drop table extending entirely across the recessed portion of the pit and adapted to be dropped bodily into said recesses for handling long trucks, and a detachable sub-top forming a part of said table adapted to be dropped independently of the table and to bridge the unrecessed portion of the pit for handling short trucks and single pairs of wheels.

11. In drop pit apparatus for servicing railroad vehicles, in combination, a plurality of tracks, a drop pit capable of receiving a relatively short truck or a single pair of wheels to be dropped from a vehicle, recesses formed in opposite side walls of one porton of the pit for increasing the effective width of such portion to accommodate relatively long trucks to be dropped from a vehicle, a drop table extending entirely across the recessed portion of the pit and adapted to be dropped bodily into said recesses for handling long trucks, a detachable sub-top forming a part of said table adapted to be dropped independently of the table and to bridge the unrecessed portion of the pit for handling short trucks and single pairs of wheels, and means for transporting said sub-top from one pit section to the other.

JOHN E. MINTY.